United States Patent
Machin et al.

(10) Patent No.: US 6,877,034 B1
(45) Date of Patent: Apr. 5, 2005

(54) PERFORMANCE EVALUATION THROUGH BENCHMARKING USING AN ON-LINE QUESTIONNAIRE BASED SYSTEM AND METHOD

(75) Inventors: David R. Machin, Santa Maria, CA (US); Jon Anton, Santa Maria, CA (US)

(73) Assignee: Benchmark Portal, Inc., Orcutt, CA (US)

( * ) Notice: Subject to any disclaimer, the term of this patent is extended or adjusted under 35 U.S.C. 154(b) by 1112 days.

(21) Appl. No.: 09/652,029

(22) Filed: Aug. 31, 2000

(51) Int. Cl.[7] .................. G06F 15/173; G06F 11/30
(52) U.S. Cl. ................. 709/223; 702/182; 702/188; 707/101
(58) Field of Search .................. 709/223, 224; 706/20, 50, 934, 925; 705/10, 416; 702/127, 182, 188; 707/101

(56) References Cited

U.S. PATENT DOCUMENTS

| | | | | | |
|---|---|---|---|---|---|
| 5,852,819 | A | * | 12/1998 | Beller | 707/1 |
| 5,909,669 | A | * | 6/1999 | Havens | 705/11 |
| 5,956,709 | A | * | 9/1999 | Xue | 707/3 |
| 6,038,544 | A | * | 3/2000 | Machin et al. | 705/11 |
| 6,556,974 | B1 | * | 4/2003 | D'Alessandro | 705/10 |
| 6,574,621 | B1 | * | 6/2003 | Lautzenheiser et al. | 707/4 |
| 6,728,693 | B1 | * | 4/2004 | Lautzenheiser et al. | 707/1 |

OTHER PUBLICATIONS

Web Site Evaluation Design/Planning. and Methodology for NIH. (Web Site Evaluation and Performance Measures Toolkit). Final Report. Mar. 31, 2000.*
ISO Standards, Usability Partners (pp. 1–6).*
Developing and Implementing Effective Web–based Surveys, Andrews, S. & Feinberg, S.(pp. 1–4).*
A machine–learning apprentice for the completion of repetivetive, Hermens & Schlimmer, IEEE Computer Society Press, 1993, ISBN: 0 8186 3840 0, p. 164–170.*
New eForm products automate the collect & processing of web and corporate forms using HTML, Adobe PDF & XML industry standards: Cardiff eForm products clean web data, saving organizations over GBP100 per form transactions. M2 Presswire, Pna, Newswire, 8/00.*

* cited by examiner

Primary Examiner—Beatriz Prieto
(74) Attorney, Agent, or Firm—Jacobson Holman PLLC

(57) ABSTRACT

An on-line benchmarking system and method that enables requesting users to define customized peer groups within an extensive database of participants, and to be compared with such customized groups in a wide range of performance categories. The system and method incorporates a range of detailed reporting options that not only present comparison data, but also financially quantify performance gaps and identify and rank a range of solution options.

19 Claims, 14 Drawing Sheets

Inbound Performance Metrics

| Metric Description | Your Center Survey Response | Peer Group | | | | Best-in-Peer Group | | | | All Participants | | | |
|---|---|---|---|---|---|---|---|---|---|---|---|---|---|
| | | Median | Average | Standard Deviation | Highest Value | Median | Average | Standard Deviation | Highest Value | Median | Average | Standard Deviation | Highest Value |
| *What are your inbound call center service level statistics?* | | | | | | | | | | | | | |
| Average speed of answer (seconds) | 75.0 | 10.0 | 56.0 | 120.2 | 411.0 | 10.0 | 20.5 | 25.4 | 87.0 | 20.0 | 30.7 | 50.3 | 900.0 |
| Average talk time (minutes) | 3.0 | 4.0 | 9.0 | 11.8 | 42.0 | 4.0 | 5.7 | 4.7 | 13 | 3.0 | 8.8 | 30.8 | 342.0 |
| Average after call work time (minutes) | 3.0 | 1.0 | 3.1 | 5.0 | 15.0 | 1.0 | 3.3 | 5.3 | 15 | 1 | 8.6 | 91.1 | 2,661.0 |
| Average calls abandoned | 7.00% | 3.00% | 4.82% | 6.15% | 22.00% | 4.00% | 5.30% | 6.25% | 22.00% | 3.00% | 4.62% | 6.43% | 93.00% |
| Average time in queue (seconds) | 10.0 | 20.0 | 34.4 | 39.8 | 138.0 | 28.0 | 37.8 | 40.2 | 138.0 | 30.0 | 35.8 | 47.0 | 600.0 |
| Average number of calls closed on first | 75.00% | 70.00% | 64.64% | 23.63% | 85.00% | 73.00% | 64.10% | 24.84% | 85.00% | 73.00% | 59.62% | 35.42% | 100.00% |
| Average TSR occupancy | 85.00% | 62.00% | 59.27% | 33.04% | 100.00% | 72.00% | 65.20% | 27.99% | 100.00% | 74.00% | 59.79% | 33.56% | 100.00% |
| Average time before abandoning | 300.0 | 26.0 | 59.0 | 54.7 | 180.0 | 26.0 | 46.9 | 39.2 | 120.0 | 45.0 | 53.6 | 60.6 | 720.0 |
| Average adherence to schedule | 70.00% | 85.00% | 72.09% | 35.93% | 98.00% | 86.00% | 79.30% | 28.28% | 98.00% | 88.00% | 67.76% | 38.53% | 100.00% |
| Cost per call | $1.00 | $3.00 | $3.82 | $2.86 | $9.00 | $3.00 | $4.20 | $2.70 | $9.00 | $4.00 | $9.88 | $22.80 | $500.00 |
| Inbound calls per 8-hour shift per TSR | 50.0 | 45.0 | 42.1 | 23.3 | 70.0 | 53.0 | 46.3 | 19.7 | 70.0 | 52.0 | 78.6 | 287.2 | 7,000.0 |
| Percentage attendance | 96.00% | 80.00% | 77.65% | 27.44% | 98.00% | 80.00% | 76.10% | 28.48% | 98.00% | 81.00% | 66.75% | 37.21% | 112.00% |

| Metric | Your Center | Peer Group | Value Creating Gap | Value Destroying Gap |
|---|---|---|---|---|
| *TSR Employment* | | | | |
| Ratio TSR's / supervisor | 24 | 11.39 | 110.7% | |
| *TSR Hiring Costs* | | | | |
| Cost to bring on a new TSR (x1000) | $25,000.00 | $7,451.18 | | 235.5% |
| *Inbound performance metrics* | | | | |
| Average speed of answer (seconds) | 75.0 | 56.00 | | 33.9% |
| Average talk time (minutes) | 3.0 | 9.00 | 66.7% | |
| Average after call work time (minutes) | 3.0 | 3.09 | 2.9% | |
| Average calls abandoned | 7.0% | 4.8% | | 45.3% |
| Average calls blocked | 0.0% | 1.8% | 100.0% | |
| Average time in queue (seconds) | 10.0 | 34.4 | 70.9% | |
| Average number of calls closed on first contact (once and done calls) | 0.8 | 0.6 | 16.0% | |
| Average adherence to schedule | 70.0% | 72.1% | | 2.9% |
| Cost per call | $1.00 | $3.82 | 73.8% | |
| Inbound calls per 8-hour shift per TSR | 50.0 | 42.1 | 18.8% | |

FIG. 12

| Metric | Your Center | Peer Group | Absolute Gap | Relative Gap | Gap Value |
|---|---|---|---|---|---|
| *TSR Employment* | | | | | |
| Ratio TSR's / supervisor | 1.00 | 11.96 | -10.96 | 91.64% | $ (210,458) |
| *TSR Hiring Costs* | | | | | |
| Cost to bring on a new TSR (x1000) | $45.00 | $7.86 | $ (37,137.68) | -472.35% | $ 18,971 |
| *Inbound Performance Metrics* | | | | | |
| Average talk time (minutes) | 7.00 | 6.38 | -0.62 | -9.64% | $ (89,182) |
| Average after call work time (minutes) | 8.00 | 19.45 | 11.45 | 58.88% | $ 1,660,059 |
| Average calls abandoned | 6.00% | 5.95% | -0.05% | -0.91% | $ (6,023) |
| Average calls blocked | 0.00% | 3.37% | 337% | 100.0% | $ 53,462 |
| Average time in queue (seconds) | 26.00 | 37.02 | 11.02 | 29.76% | $ 27,540 |
| Average number of calls closed on first contact (once and done calls) | 68.00% | 74.94% | -6.94% | -9.25% | $ (17,338) |
| Average adherence to schedule | 89.00% | 86.52% | 2.48% | 2.86% | $ 2,444 |
| Cost per call | $0.15 | $11.65 | $ (3.35) | -28.70% | $ (334,524) |
| Inbound calls per 8-hour shift per TSR | 0.50 | 64.53 | -14.53 | -22.51% | $ (36,018) |

FIG. 13

| Gap Name | Solution | Cost per Seat | ImplementationTime | Risk | GapImpact | ROI | OptimalDecisionIndex |
|---|---|---|---|---|---|---|---|
| Average adherance to schedule | Workforce scheduling | $300 | 80 days | 65 | 65% | -16.94% | -0.15 |
| | Training | $600 | 90 days | 60 | 25% | -84.03% | -0.72 |
| Average calls abandoned | Workforce scheduling | $300 | 80 days | 65 | 85% | -36.38% | -0.32 |
| | Client server | $1500 | 180 days | 85 | 45% | -91.19% | -0.46 |
| | CTI | $900 | 120 days | 75 | 90% | -70.64% | -0.47 |
| | IVR | $300 | 50 days | 45 | 85% | -36.38% | -0.48 |
| | Skill Based Routing | $200 | 50 days | 40 | 35% | -48.62% | -0.70 |
| | ACD | $700 | 45 days | 60 | 85% | -84.35% | -0.70 |
| | Temporary agents | $4000 | 100 days | 30 | 10% | -99.27% | -0.79 |
| | Part-time agents | $1000 | 75 days | 40 | 10% | -97.06% | -1.06 |
| | Additional lines | $800 | 30 days | 30 | 70% | -74.31% | -1.36 |
| Cost to bring on a new TSR | Applicant testing | $100 | 30 days | 40 | 20% | 1173.91% | 20.38 |
| | Applicant screening | $250 | 40 days | 60 | 30% | 664.35% | 7.84 |
| | Performance compensation | $1000 | 30 days | 90 | 15% | -4.46% | -0.04 |
| | Temp. Agents | $4000 | 100 days | 30 | 10% | -84.08% | -0.67 |
| Turnover full-time Inbound | Expert systems | $1500 | 180 days | 95 | 45% | -91.52% | -0.44 |
| | Web integration | $2500 | 130 days | 90 | 75% | -91.52% | -0.49 |
| | IVR | $300 | 50 days | 45 | 65% | -38.76% | -0.51 |
| | ANI | $300 | 60 days | 60 | 40% | -52.31% | -0.65 |
| | Skill based routing | $200 | 50 days | 40 | 35% | -50.53% | -0.72 |
| | Training | $600 | 90 days | 40 | 25% | -88.22% | -0.92 |
| | Predictive dialer | $700 | 60 days | 40 | 50% | -79.81% | -0.99 |
| | Relationship marketing | $600 | 60 days | 40 | 30% | -85.87% | -1.08 |
| | CBT | $1000 | 120 days | 10 | 20% | -94.35% | -1.09 |
| | Cubical size | $1000 | 45 days | 30 | 5% | -98.59% | -1.52 |
| | Coaching | $200 | 60 days | 20 | 10% | -85.87% | -1.55 |

FIG. 14

PERFORMANCE EVALUATION THROUGH BENCHMARKING USING AN ON-LINE QUESTIONNAIRE BASED SYSTEM AND METHOD

BACKGROUND OF THE INVENTION

1. Field of the Invention

The present invention is related to the field of corporate performance evaluation and improvement and, more particularly, to an automated on-line system and method for providing a comparative, statistics-based analysis of industry peer performance through benchmarking.

2. Description of the Related Art

Benchmarking is an essential element of corporate performance evaluation worldwide. A "benchmark" is a standard of performance or a point of reference that serves as the basis of understanding relative standing or performance. Benchmarking involves comparing the vital statistics of one enterprise against those of a peer group of similar companies. Whether related to personnel, capital investment, customer care, marketing or administrative support operations, when decisions are to be made managers require as much information as can reasonably be obtained. Benchmarking is critical to identifying those aspects of corporate performance requiring improvement and formulating a knowledge-based plan of action to achieve objectives.

Benchmarking, in some form, has always existed. More recently, however, there has been a major push in many industries to identify the metrics that are central to success, and to find ways to accomplish more effective benchmarking. Some companies have banded together to exchange data among themselves on a formal or informal basis. However, often the data is partial in scope and limited in geographical reach. Similarly, some consulting companies have developed benchmarking practice units, but these are only able to provide "snapshot" studies to clients and are often accomplished pursuant to engagements that are simply cost prohibitive for many industry players.

Customer Relationship Management (CRM) operations, among them call centers, lend themselves particularly well to benchmarking because so many measurable elements of these centers are collected with total objectivity through the use of technology. A need exists among such operations for cost-effective benchmarking services that provide valuable comparison data with both peer groups that have been specifically selected as well as broader peer groups worldwide.

SUMMARY OF THE INVENTION

In view of the foregoing, one object of the present invention is to provide an on-line benchmarking service accessing a comprehensive database of industry performance metrics.

Another object of the invention is to provide industry professionals with a tool for evaluating company performance and targeting areas for improvement through an automated system accessible via a distributed computer network such as the Internet.

A further object of the invention is to enable business process managers to compare their performance data with that of a group of industry peers having characteristics specifically defined by the manager requesting the comparison and analysis.

A still further object of the invention is to provide a benchmarking tool capable of generating a variety of data analysis reports which may be customized to meet the particular needs of the requester.

Another object of the invention is to provide business managers with a means of obtaining current and up-to-date comparison data in any number of dynamically changing industries in order to stay abreast of both strengths and weaknesses as compared with industry peers.

Yet another object of the invention is to provide targeted benchmarking data at a very reasonable cost.

In accordance with this and other objects, the present invention is directed to an on-line benchmarking system and method. The benchmarking model is community-based, springing from academic origins while providing a wealth of additional management decision-oriented features to maximize its usefulness and impact. The system is accessible through a web site on a distributed computer network such as the Internet. Users enter the web site and input a member code to access the benchmark study datamart. In response to a detailed questionnaire, users submit data summarizing their performance metrics on-line. Input data is incorporated into the database.

As a safeguard against errors in data entry, the datamart system includes a delinquent data checker for reviewing input data in order to identify data values that are suspected of having been entered in error. Such suspicion may arise from the data values themselves, in light of the bulk of data values previously entered for a particular index or generally anticipated values determined from the nature of the index. Input data is compared with predetermined valid data values or ranges for each index and data that is found to fall outside the predetermined valid data value or range for a particular index is placed on a list for subsequent verification.

The benchmark study datamart processes the data in accordance with user-specified criteria defining a peer group and affords the user with a range of reporting options highlighting strengths and weaknesses as compared to industry peers, and providing realistic solution options for minimizing performance and financial gaps. The datamart is thus a continually updated and expanded model, which involves from hundreds to thousands of participants. Through such broad-based participation and automated access approach, the results obtained through the present invention not only offer superior quality and breadth of data, but also reduced cost.

These and other objects of the invention, as well as many of the intended advantages thereof, will become more readily apparent when reference is made to the following description taken in conjunction with the accompanying table and figures.

BRIEF DESCRIPTION OF THE DRAWINGS

FIG. 9 is a sample peer group comparison report generated in accordance with the present invention;

FIG. 10 is a sample peer group ranking report generated in accordance with the present invention;

FIG. 12 is a sample performance gap analysis report generated in accordance with the present invention;

FIG. 13 is a sample financial gap analysis report generated in accordance with the present invention; and FIG. 14 is a sample gap versus solution optimizer index report generated in accordance with the present invention.

DETAILED DESCRIPTION OF THE PREFERRED EMBODIMENTS

In describing a preferred embodiment of the invention, specific terminology will be resorted to for the sake of clarity. However, the invention is not intended to be limited to the specific terms so selected, and it is to be understood that each specific term includes all technical equivalents which operate in a similar manner to accomplish a similar purpose.

Benchmarking involves comparing the vital statistics of one enterprise against those of a peer group of similar companies. A few examples of the types of measurement that might be benchmarked, for the sake of illustration, include costs of hiring, training and compensating employees in various geographic locations; cost to handle an inbound telephone call; percent overhead cost structure; sales per employee; years of customer retention, etc.

Virtually every type of business may benefit from benchmarking. For the purposes of this document, many of the examples used will be directed to Customer Relationship Management (CRM) call centers, but in no way is this intended to suggest that the present invention is limited to use with call centers.

Figure 1:
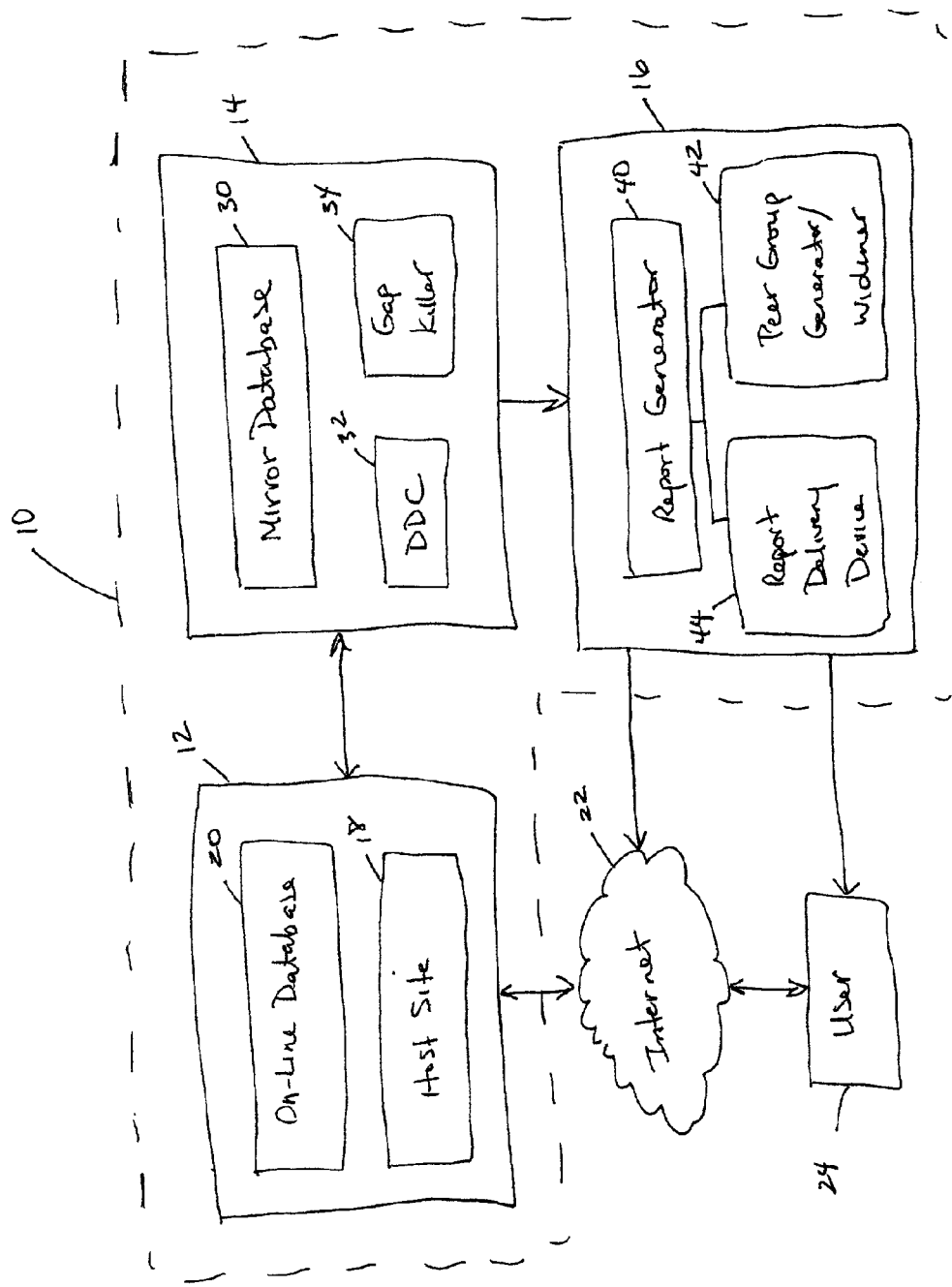
FIG. 1 shows a block diagram of the on-line benchmarking system in accordance with the present invention.

As illustratively shown in FIG. 1, the present invention is directed to a web-integrated on-line benchmarking system referred to herein as the "datamart". The datamart 10 includes a data entry section 12, a data analysis section 14, and a report generation/delivery section 16. The datamart interacts with users 24 over a distributed computer network such as the Internet 22.

The data entry section 12 includes a host site 18 having a search engine for accessing an on-line database 20. Data to be entered into the on-line database 20 is input through the data entry section 12. The host site 18 is preferably embodied as a web site accessible over the Internet 22. Users 24 access the host web site 18 through the Internet 22, using a web enabled computer or other web enable device. As used herein, a web enabled computer shall be understood to mean any computer or other electronic device having the necessary software and telecommunications capability to connect to the Internet or similar distributed computer network for communications exchange.

As an Internet web site, the host site 18 may be configured in a number of ways, as would be known by persons of ordinary skill in the art. Benchmarking data is stored in the on-line database 20, which may be embodied as one or more databases.

The data analysis section 14 is connected to the data entry section 12 and includes a mirror database 30, a delinquent data checker (DDC) 32, and a gap killer 34. The mirror database 30 is a copy of the on-line database 20. During data analysis, the data in the on-line database 20 remains intact while the data stored in the mirror database 30 is manipulated. Each of these elements within the data analysis section 14 will be discussed in greater detail hereinafter.

The report generation/delivery section 16 is connected to the data analysis section 14 and includes a report generator 40, a peer group generator/widener 42, and a report delivery device 44. Each of these elements within the report generation/delivery section 14 will be discussed in greater detail hereinafter.

A user wishing to initiate a benchmarking study with the datamart 10 accesses the host site 18 over the Internet 22. Upon logging onto the host site 18, the user is greeted with a "Home" page. As is known in the art, the "Home" page is the gateway to the site and provides the user with an overview of the site's available information and procedures. Other pages or folders may be selected by clicking on the visible tabs and/or listed links as would be known by one of skill in the art. Each page, once accessed, contains multiple links to other pages, as is known in the art. The benchmarking section is accessible through an appropriately named link.

Figure 2:
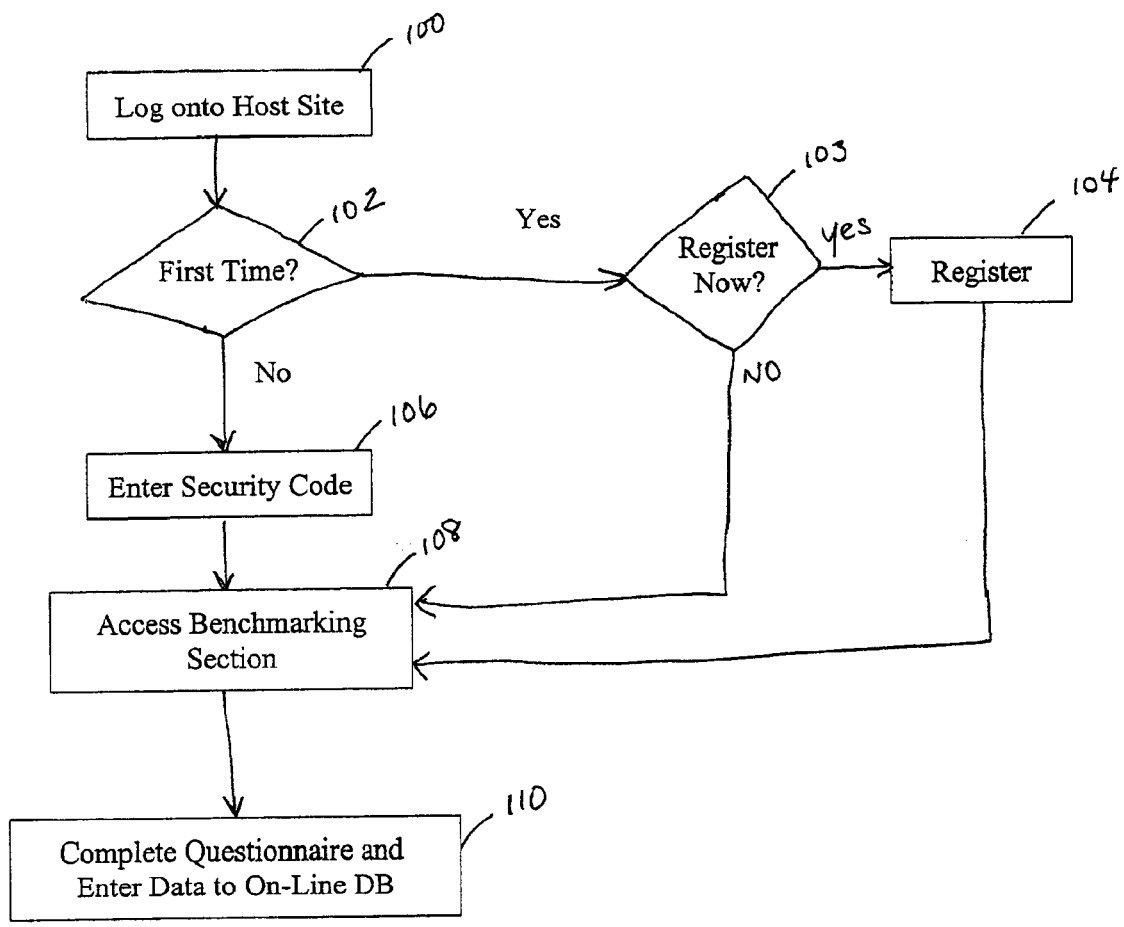
FIG. 2 is a flow diagram of the data entry process using the data entry section of FIG. 1.

FIG. 2 presents a flowchart of the process of data entry in accordance with the present invention, which begins by logging onto the host site, step 100. If the web site is being accessed for the first time, step 102, the user typically chooses at that time, step 103, to register with the site administrator, step 104. Registration may be accomplished following a screen-prompted menu provided at the host web site 18. As part of the registration process, the user receives a password or other assigned security code.

Those users whose access is not a first time access, steps 102, e.g., registered users, enter their individually assigned security code, step 106, and are granted access to the benchmarking section, step 108. Once within the benchmarking section, the user may complete an on-line survey, step 110, and the entered data is input automatically to the on-line database 20.

In some instances it may be preferable to allow the user to choose not to register initially, step 103, but rather to enter survey data prior to completing the registration process; the present invention supports this sequence of entry as well. In this instance, the user may be given a guest security code or the code requirement may be waived or otherwise satisfied. The user then accesses the benchmarking section, step 108, and enters pertinent data, step 110.

Figure 3:
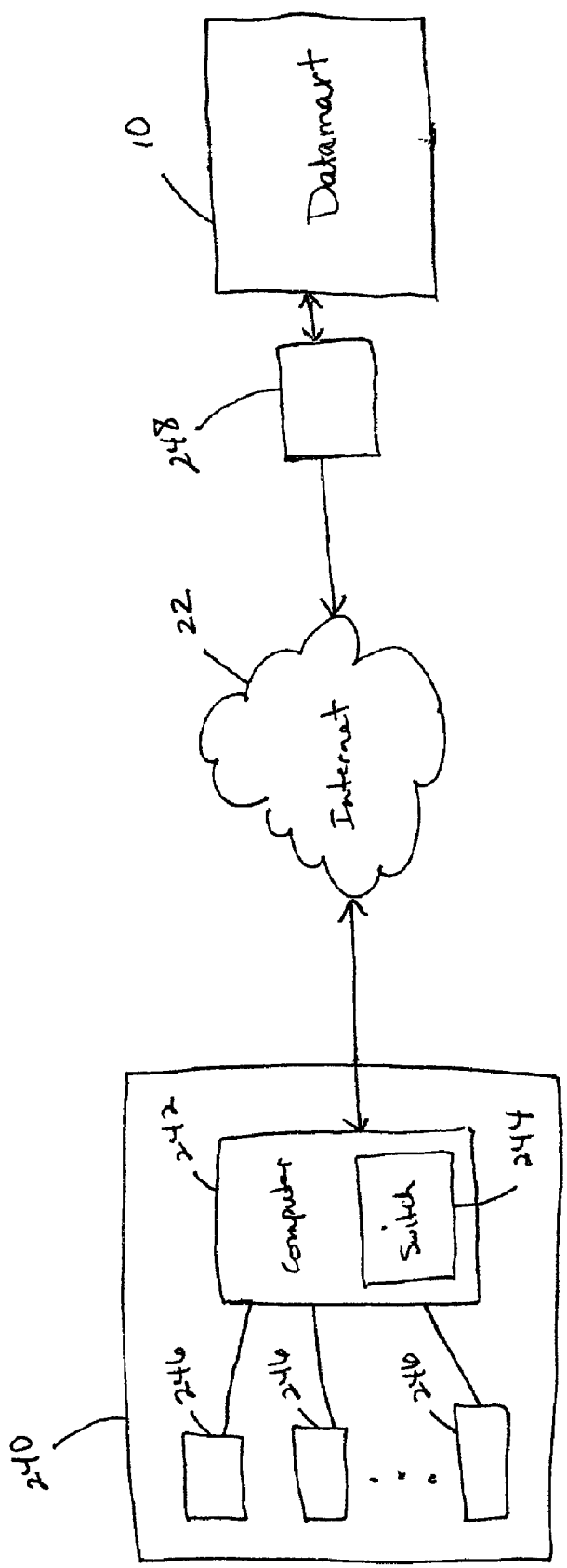
FIG. 3 is a block diagram of the automated data entry system in accordance with the present invention.

As shown in FIG. 3, data entry may also be completed automatically through the use of automated telecommunications links such that manual input through the web site is not necessary. Such automatic entry is possible within certain industries, such as the call center industry, using existing data monitoring and generation equipment of the user.

In the example of a call center user 240, a computer system 242 typically monitors call handling and related functions, directing calls to particular operators 246. The computer system 242, which includes a switch 244, monitors call related performance parameters, and generates a range of pertinent data on an automatic basis. Such a computer system may include an automatic call distributor. A variety of switches are commercially available and may be embodied in hardware and/or software to perform data monitoring and reporting functions, as would be known by persons of skill in the art. Such switches may be programmed or otherwise configured to send the generated data to the datamart 10 via an email over the Internet 22 at predetermined intervals, at particular times, etc. Using custom modules 248 developed specifically for interfacing with particular switches 244, or types of switches, the datamart 10 extracts the data needed for a particular report or reports from the email. In a preferred embodiment, the modules are embodied in software and programmed to gather the incoming email, locate and process the data, and correlate the data with the source of the email for report generation.

Using the system summarized in FIG. 3, data generated by a call center user 240 as a matter of regular operation may be electronically conveyed to the datamart 10 with no additional effort required on the part of the call center other than initial configuration of the switches. Switch coding directs the generation of a particular report, or reports, which is generated by the datamart and subsequently sent to the requesting call center. Through this automated data entry approach, regular performance evaluations may be conducted as a matter of routine business practice with little or no added effort on the part of the call center. Other industries which use automated computer monitoring equipment such as described in connection with the call centers may also be supported with automatic data entry in a similar manner.

Data may also be entered manually through the web site. The on-line survey includes a range of questions pertinent to the user's particular industry. In a preferred embodiment, the on-line survey includes a linear questionnaire constructed for on-screen presentation in three frames. One frame, called the navigation bar, displays the section of the questionnaire currently being completed. A second frame, the question number frame, identifies question numbers completed as well as the current question number. A third frame displays the questions. Other presentation formats are of course possible and are included within the scope of the invention.

Initially the user enters the questionnaire from the beginning. If the user must exit the questionnaire prior to completion, when he or she returns to complete the questionnaire the last question answered will be displayed. In the preferred embodiment the user is not permitted to skip questions without providing an answer. However, zero may be accepted as a valid answer to most numeric questions. By accepting the widest range of data during the data input phase, and then filtering and removing inconsistent data during the data analysis phase, the data input phase is streamlined, minimizing the time necessary for the user to complete data entry.

As questions are answered, the completed question numbers appear in the question number frame. The user may return to previously answered questions by clicking on the appropriate question number in the question number frame. When the user completes the last question in the section, the next section is shown automatically and the navigation bar is updated. The user may return to a previous section by clicking on the appropriate section number in the navigation bar. Completed sections may be displayed in one color while sections not yet completed are displayed in another color.

Because the questionnaire is linear, questions having a prerequisite will be skipped when the prerequisite is not satisfied. In other words, questions having a prerequisite will only be shown when the prerequisite question has been answered correctly.

The data entry section also eliminates certain questions that do not apply to the particular user. For example, if the user represents a call center which does not handle any outbound calls, the data input section skips all questions that apply to outbound calls. This is done automatically by the host site through the use of the answers to specific questions to decide whether succeeding questions should be displayed.

The data that is collected may be divided into three types, namely real, nominal, and text. Real values are numeric values and may include decimals. Nominal values are results of multiple choice questions, e.g., true/false, daily/weekly/monthly, etc. Text values are responses to open-ended questions to the user (e.g., what vendor do you use for reporting?).

As the data is collected a low level of validity checking is performed on the real data types by the data entry section. For certain questions, the entered value is compared to a range of realistic answers. If the data input by the user is outside the range, a warning may be displayed. However, the data is still accepted and the user may decide to ignore the warning and continue.

While on-line data entry or automated electronic data transfer represents the preferred embodiments, users may also complete hard copy questionnaires which may be mailed or sent via facsimile to the datamart administrator for input to the database.

For the purposes of illustration, the contents of a sample survey will be summarized herein as presented for users involved in call centers. This summary is not inclusive of everything that may or could be asked but is provided to give some idea of the nature and scope of the information collected during the data entry phase.

In the context of call centers, users may be asked questions relating to their specific industry area, total revenue, types (inbound, outbound, internal) and number of calls handled, and functions associated with each type of call. For inbound calls functions may include call routing, complaint resolution, customer service, dispatching, order taking, reservations, technical support to outside customers, etc. For outbound calls functions may include telemarketing and lead generation, collections, customer surveys, market research, etc. The call center requesting user is also asked to provide a breakout of costs for such things as human resources, computer equipment, real estate, toll-free service, etc.

The survey includes a broad range of inbound performance measures including averages for speed of answer, talk time, after call work time, number of abandoned calls, time before abandoning, time in queue, sale value and number of inbound calls per telephone operator shift. Performance measures also include percentage of calls closed on first call, percentage calls blocked, percentage of time spent by operators or telephone service representatives handling calls, adherence to schedule, and cost per call.

Outbound performance measures include information on cost per call and cost per sale, sales per hour, average sale value, percentage of outbound calls that result in a sale, contacts per hour, and averages for sales revenue per operator per year, revenue collected per seat per shift, and sales revenue per seat per shift.

The survey may also be used to collect information relating to caller satisfaction measurement, e.g., how satisfaction is measured, the degree of satisfaction reported, etc. The requesting user's data may also incorporate input, received through automated telecommunications links, from an independent entity measuring customer satisfaction.

The survey can also collect data relating to call center strategy, e.g., whether focus is on acquisition or retention, basis for customer routing to particular agents, etc.; human resource management, e.g., educational level of operators, turnover, compensation, hiring criteria and practice, performance measurement criteria, training, etc.; process and knowledge, e.g., customer and file status information available to operators, recipients of data warehousing and mining data, customer access channels, basis for call routing, etc.; technology solutions, e.g., hardware and software currently used or being contemplated for use; outsourcing, e.g., percentage of calls outsourced, reasons for outsourcing, cost of outsourcing, etc.; and facilities and design, e.g., number of seats, number of seats added in past year, average size of work space, desktop workstation equipment, etc.

Again, this survey data summary is representative only and additional or alternative information may be requested depending on the user and the nature of the pertinent industry.

As part of the data entry phase, after data entry, or at virtually any time desired by the user, the user can specify particular characteristics defining the peer group or a new peer group against which that user wishes to be benchmarked. A "peer group" does not necessarily connote competitors, but most often includes those companies having the same general profile of activities as the accessing user. For instance, using the example of call centers, a peer group might be all call centers handling mostly inbound calls that are mostly business-to-business in a call center of over 100 agents for a company with annual revenues of over 1 billion dollars. As another example, a peer group may be defined as only call centers that are inbound business-to-business, with between 100 and 200 agents, that handle at least 50% order taking and order tracking calls, and that handle at least 25% technical support calls. Peer group parameters may be derived from identification parameters contained within the data input by the accessing user. Alternatively, the user may specifically identify peer group identification parameters that may be of a different scope (e.g., broader or narrower) than those actually defining its own business position and request comparison with this customized group. This ability to specifically identify the characteristics of a desired peer group and to be compared in a detailed manner against that group provides requesting users with a tremendous means of quantifying performance and identifying success strategies not before available in the prior art.

Figure 4:
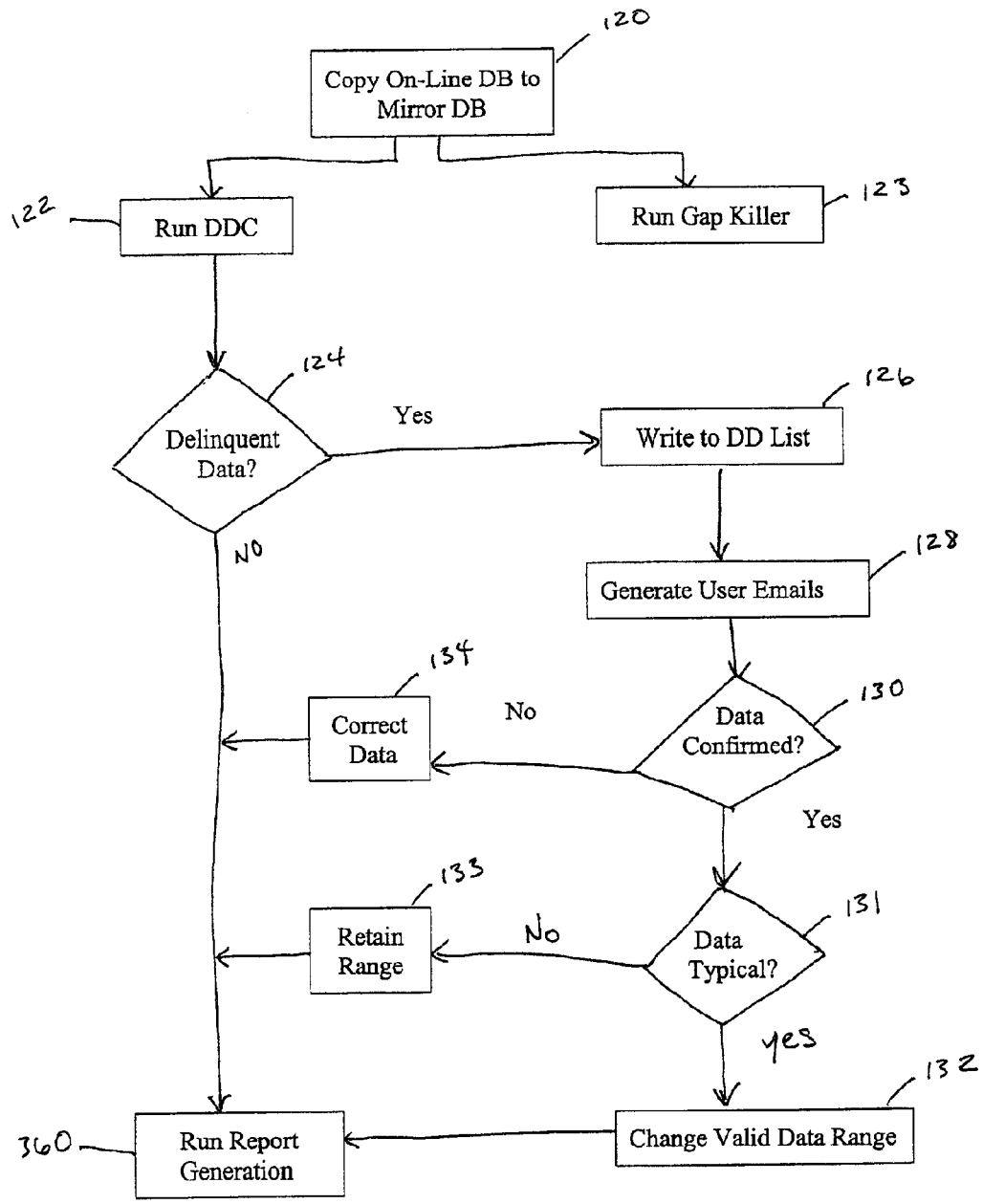
FIG. 4 is a flow diagram of the overall data analysis process using the data analysis section of FIG. 1.

The next phase is the data analysis phase, which is summarized in the flowchart of FIG. 4. During a specified time and on a regular basis, the on-line database is copied to the mirror database, step 120. The remainder of the steps shown in FIG. 4 are then performed using the data in the mirror database 30. In a preferred embodiment, the on-line database 20 is copied to the mirror database 30 on a daily basis, such as just before midnight.

Acting on the mirror database, the delinquent data checker (DDC) is run, step 122, to verify the accuracy of the input data in an automated manner. The gap killer is also run, step 123. The process undertaken by the DDC is summarized in FIG. 5. The process undertaken by the gap killer is summarized in FIG. 6.

Figure 5:
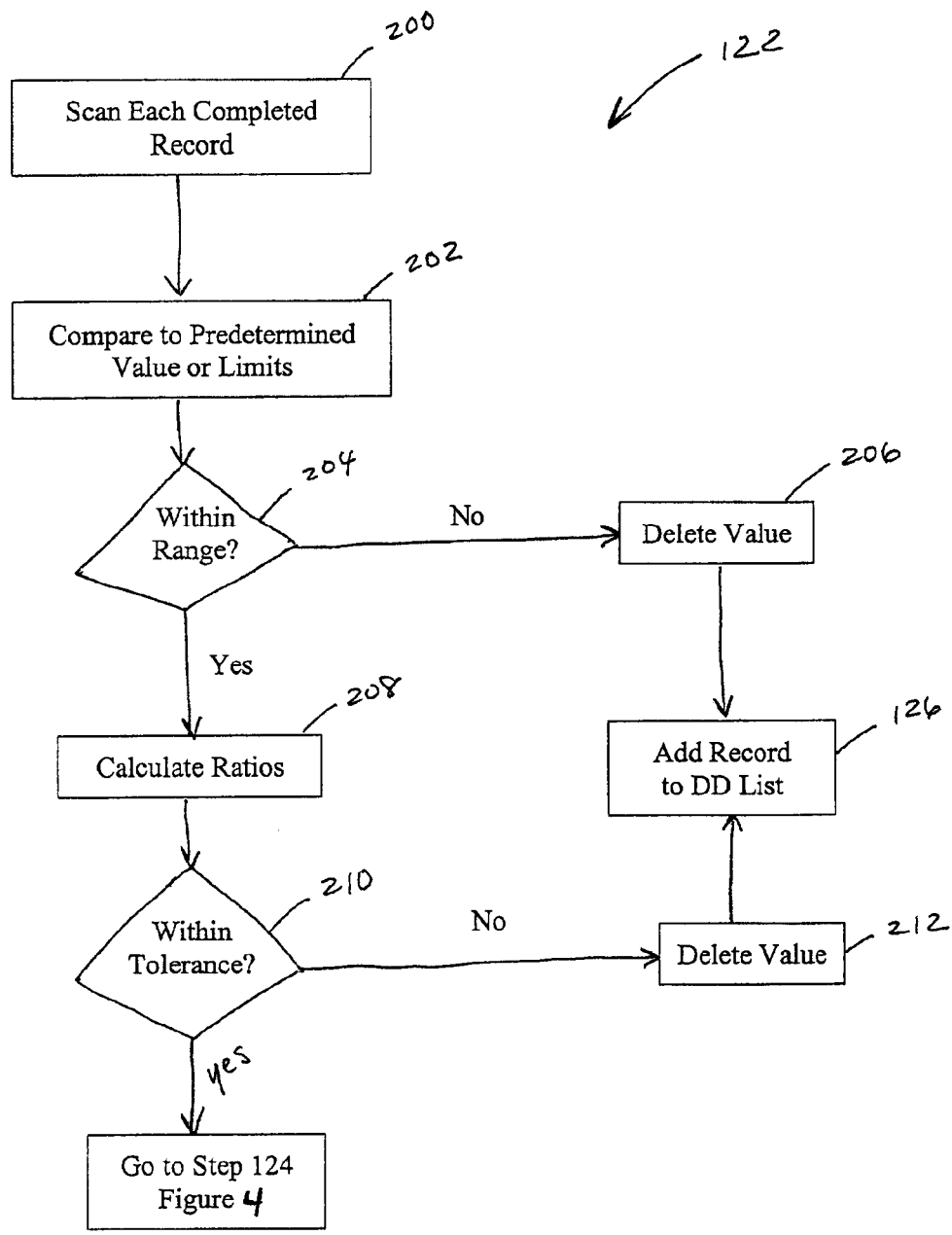
FIG. 5 is a flow diagram of the operation of the delinquent data checker of FIG. 4.

As shown in FIG. 5, the DDC scans each completed record of the database, step 200, and compares every real value in the database to a predetermined data comparator value or limit, step 202. In the preferred embodiment the comparison is generally made against an upper and lower limit. If the value being compared is outside the specified range, step 204, then that value is deleted, step 206. In addition, certain results are calculated using values in existing fields, step 208, to ensure that the ratio between the data points is within a predefined tolerance. For example, in the case of a call center, the indicated value for cost allocated to call operation should, when divided by the number of calls received, be roughly equal to an indicated cost per call. If the ratio is not within the predefined tolerance, step 210, the values are deleted, step 212. If the ratio is within the tolerance, step 210, the method determines there is no delinquent data, step 124, and proceeds with the report generation stage, step 360. During the running of the DDC, the original data in the on-line database 20 is untouched.

When a value is deleted, then the record that contained the data is viewed as delinquent data, step 124, and is added to a list of data delinquents 126. Returning to FIG. 4, once the entire database has been scanned by the DDC, the datamart system automatically generates customized email messages to the users placed on the data delinquents list requesting data verification, step 128. Each such email describes the out of range value(s) and requests that the user confirm the validity of each piece of data in question. The user is provided with a convenient means of responding, preferably electronically such as via email, and can either verify that the data is indeed correct or acknowledge that an error was made in data entry and provide a replacement value for the delinquent data. In the event the delinquent data was indeed correct, step 130, the data is examined to determine if it is typical. If the data is typical 131, the upper or lower limit of the valid data range is changed, step 132, to specify a range that includes the user's data value. If the data is not typical 131, then the valid data range is not changed, step 133. In non-typical data situations, data correctness does not initiate a change in valid data range due to what may be considered an anomaly in the operation of the requesting user. For example, call centers relying on volunteer operators may have data values that no not fall within ranges which would be expected for call centers having paid operators.

If the delinquent data was not correct, step 130, then the data is corrected, step 134, in accordance with the user's input.

Removing delinquent data leaves holes, or gaps, in the database. In addition, when entering survey information responses to various indices, the user may intentionally or inadvertently fail to provide answers for certain of the questions. These unanswered questions also leave gaps in the body of data. While entry of data to some indices is mandatory, entry of a response to others may be omitted without compromising the value of the survey as a whole. Yet the presence of gaps in the data may be interpreted by the system as indicating that the entire body of data is defective, aborting further processing of that survey. The gap killer serves to preserve useful data that might otherwise be rejected due to non-critical data gaps in the body of data.

Figure 6:
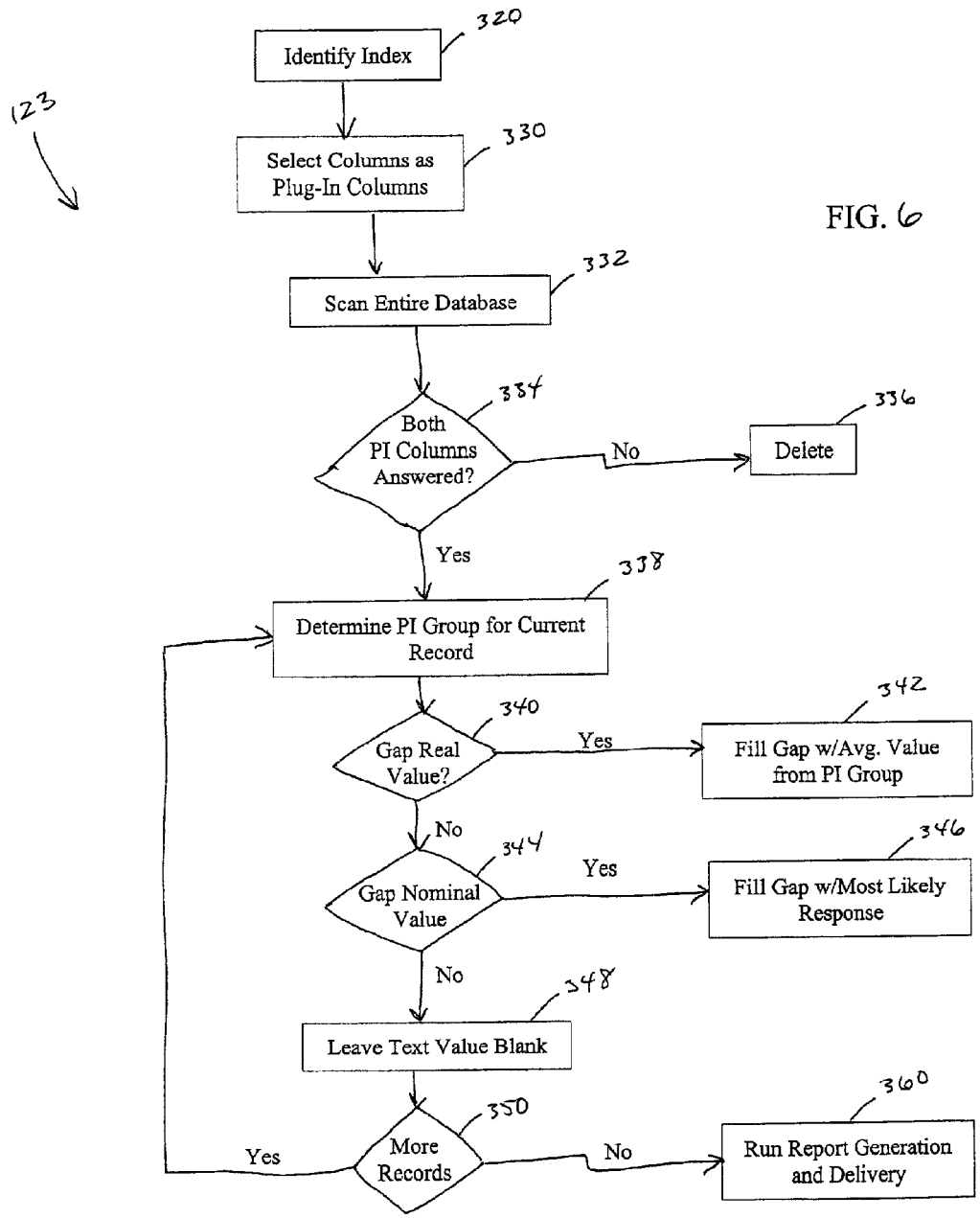
FIG. 6 is a flow diagram of the operation of the gap killer of FIG. 4.

Operation of the gap killer is summarized in FIG. 6. In order to neutralize the effect of non-essential gaps, the gap killer identifies an index containing a gap, step 320, and then determines an average database value for that index. The gap killer performs this function in two phases. First, the gap killer program selects two columns from the database, step 330; in a preferred embodiment, one of these two columns is taken from the beginning of the questionnaire and the other is taken from the end. These columns, or values for a selected parameter however presented, are known as the "plug-in columns" and are considered essential data.

The entire database is then scanned, step 332, to identify records in which both plug-in columns have been answered. If both plug-in columns have not been answered, step 334, those records are deleted, step 336.

A parallel step is to analyze the remaining records and complete the missing data. For each record having gaps, i.e., the current record, a set of records known as a "plug-in group" is determined, step 338. The plug-in group is comprised of those users whose "plug-in column" values are within a certain number of standard deviations from those of the current record. Using the plug-in group, the gaps in the current record are filled as follows. If the gap in the current record is a real value, step 340, then the gap is filled using the average value for that index from the plug-in group, step 342. If the gap in the current record is a nominal value, step 344, then the gap is filled with the most likely response, step 346. The most likely response is determined by counting the number of occurrences of each response within the "plug-in group", calculating the probability of each response, and then choosing a value based on these probabilities. Finally, gaps that would otherwise contain text values are not filled in and the text value is left blank, step 348. If there are additional records with gaps, step 350, the process loops back to step 338 to determine a plug-in group for the next current record. When all records with gaps have been processed, the data is forwarded to the report generation section, step 360.

In summary, by deleting incurable records and temporarily filling the gaps for non-essential indices in the remaining records, the gap killer completes the remaining records without changing the overall trends and averages. While the action of the gap killer may be said to reduce the absolute accuracy of the survey, this is not statistically significant. More importantly, by filling in certain gaps, survey information that might otherwise by rejected is accepted and preserved, enabling that body of survey data to be forwarded for further analysis.

The third phase of the data acquisition and processing procedure of the present invention is report generation and delivery. In a preferred embodiment, this phase is completed using the report generator 40 and the report delivery device 44. The peer group generator/widener 42 establishes the parameters of the peer group against which the current user will be compared. As discussed earlier, this peer group may be determined by the datamart on the basis of the self-describing identification information obtained from the user, or the user may specify desired criteria or peer group identification parameters defining an alternative, customized peer group.

Figure 7:
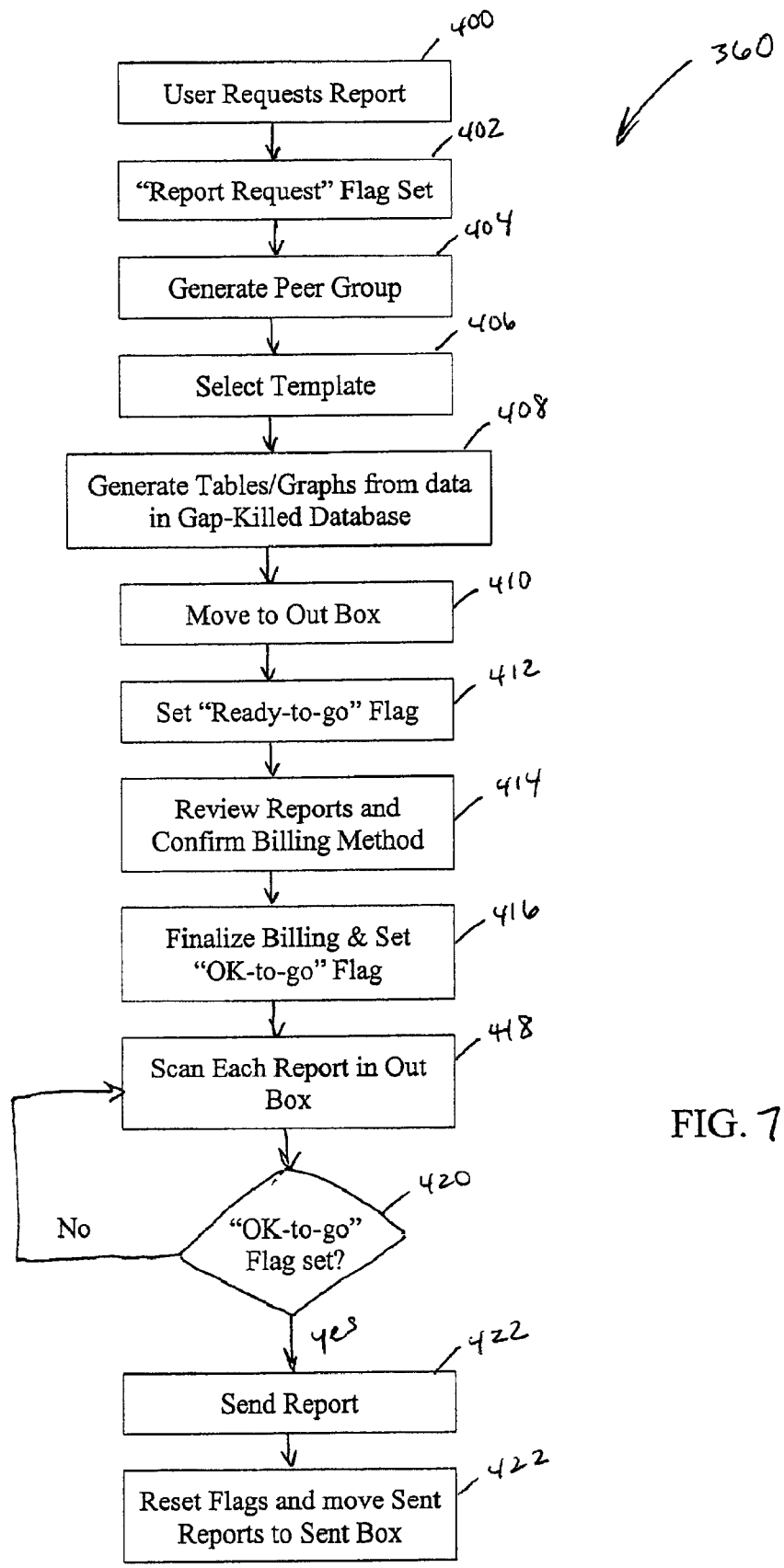
FIG. 7 is a flow diagram of the report generation and delivery processes using the report generation/delivery section of FIG. 1.

The steps undertaken during report generation and delivery in accordance with the present invention are set forth in FIG. 7. A user requests a report through the host site, step 400, and in response to this request certain flags are set in the on-line database, including a "report request" flag, step 402. When the on-line database 20 is copied to the mirror database 30, the set flags are conveyed to the mirror database.

The peer group generator establishes a peer group for the requesting user, step 404. A different peer group may be established every day, or for every cycle of the function of the present invention whether daily, or more or less frequently.

The datamart has a variety of report formats and types available. For each available report, the datamart system includes a template containing several pages of tables and/or graphs. In response to a report request, the appropriate template is selected, step 406, and each requested report is generated by creating the appropriate tables and graphs based on the data in the "gap killed" database, step 408. In the preferred embodiment, every report that is generated is assigned a unique report identification number or code. Multiple copies of the same report, which may be sent to multiple locations, each receive a different number to facilitate tracking capability as well as report integrity.

Once a set of reports is ready, the set is moved to an "out box" awaiting approval, step 410. In a preferred embodiment, each report is converted into an Adobe Acrobat® PDF file before being placed in the "out box". Other file formats may, of course, be used. If the user had requested that the report be printed and sent through the mail then the report is moved into a "print box" instead of the "out box".

Associated with each report, or set of reports as appropriate, is a "ready-to-go" flag and an "OK-to-go" flag. The "ready-to-go" flag is set once the report has been moved to the "out box" or the "print box", step 412. Setting of the "ready-to-go" flag resets the user's "report request" flag.

The reports having a "ready-to-go" flag set are reviewed for accuracy, and a method of billing for the order is confirmed, step 414. Representatively, users may receive an invoice or charge their order to a credit card, although any known manner of effecting payment could be used. Upon generation of an invoice or the charging of a credit card account, an "OK-to-go" flag for the relevant report is set, step 416. In the preferred embodiment, the review and setting of the "OK-to-go" flag are performed manually.

Once the reports have been generated, the report delivery device 44 is executed. This program scans each report or set of reports in the "out box" or the "print box", as appropriate, step 418. If the report in the "out box" or the "print box" has the "ready-to-go" flag set, the report delivery device checks to see if the "OK-to-go" flag has been set. If the "OK-to-go" flag has been set, step 420, the associated report material is emailed to the user with a standard, customized cover letter, step 422. Reports placed in the "print box" are sent to the user by regular mail or other hard copy delivery means. Once the reports have been sent, the flags are reset and the sent reports are moved from the "out box", or the "print box", to the "sent box", step 424. In this way a copy of every report is retained for future reference.

A variety of reports may be generated using the datamart system. The reports typically include a combination of text pages showing metrics and comparative results, as well as graphic pages showing comparative positioning. Representatively, the report options that may be generated include, among others, executive summary, peer group comparison, peer group ranking, peer group performance matrix, performance gap analysis, financial gap analysis, and gap versus solution optimizer index reports.

Figure 8:
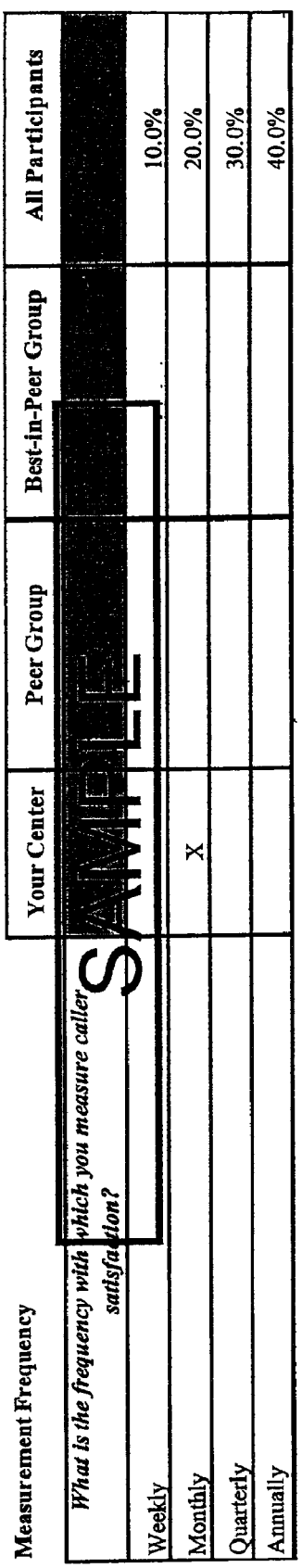
FIG. 8 is a sample executive report generated in accordance with the present invention.

The executive summary report is an overview report that compares the requesting user with all database participants. A representative executive summary report is set forth in FIG. 8.

The peer group comparison report compares the performance of the requesting user with that of a peer group on a metric by metric basis. The comparison is drawn not only with the peer group as a whole, but also with the best of the peer group (which may be defined as the top 10%) and with all participants in the database. Further detail may include an indicator of survey response (number of respondents, percentage of response, etc), as well as median, average, standard deviation and highest value scores for each of the peer group, best-in-peer group and all participants categories. The user requesting a peer group comparison report may define particular peer group identification parameters to establish a customized peer group profile. A sample sheet illustrating a representative peer group comparison report is presented in FIG. 9.

Figure 10:
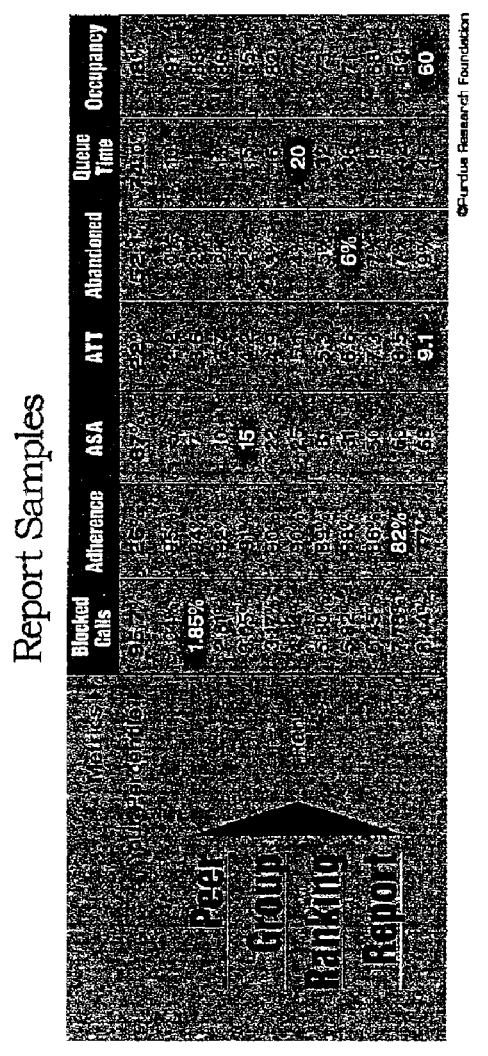

The peer group ranking report provides the requesting user with a multi-metric summary identifying how individual metrics compare with those of an individualized peer group. The report includes a percentile rank as well as an overall numeric ranking. A sample sheet from a representative peer group ranking report is set forth in FIG. 10.

Figure 11:
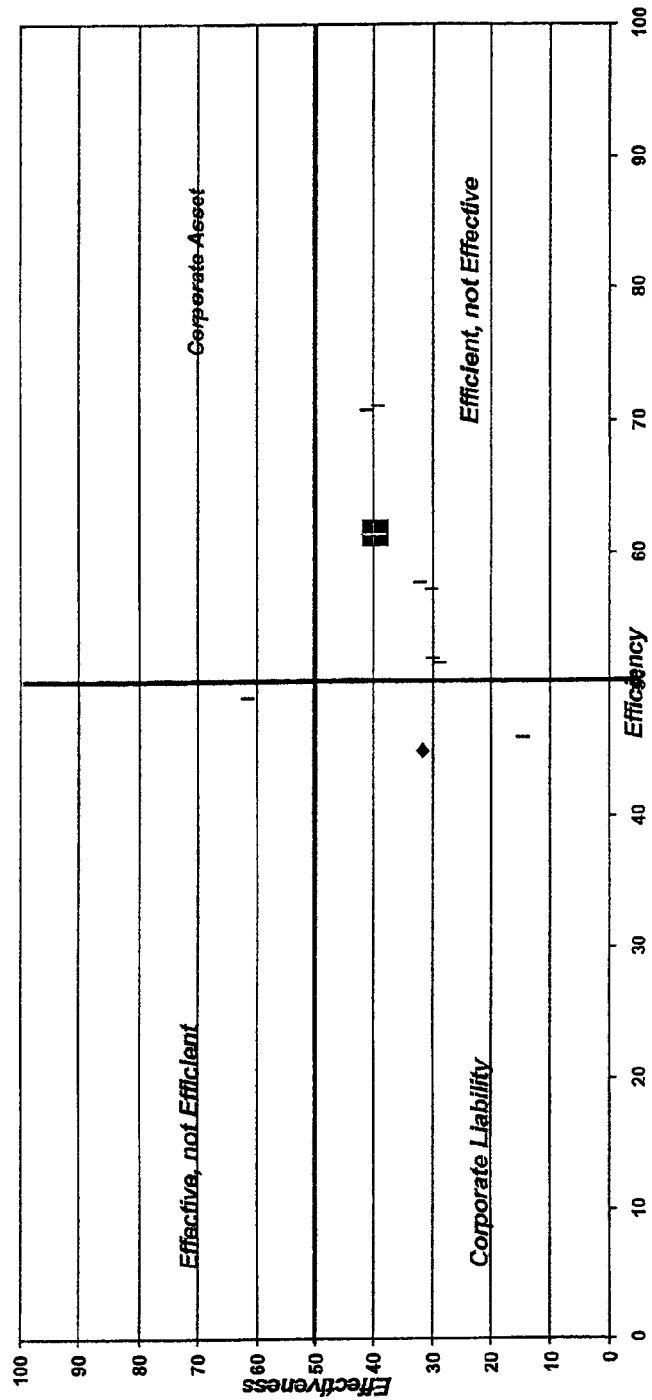
FIG. 11 is a sample peer group performance matrix report generated in accordance with the present invention.

The peer group performance matrix report graphically compares the requesting user to a selected group of participants having similar characteristics. Through a 2-by-2 matrix, this report presents efficiency versus effectiveness in a visual "balance score card" of performance. Of special importance is the fact that the requesting user's business is plotted on the same matrix with the peer group, allowing the user to immediately assess comparative performance. A representative peer group performance matrix report is presented in FIG. 11.

The performance gap analysis report allows analysis of the performance gap between the requesting user and a peer group by identifying comparative performance and then calculating a "value creating gap" or a "value destroying gap", as applicable. Looking at the sample performance gap analysis report shown in FIG. 12, for example, in the event the requesting user ranks above the peer group in a specific metric, e.g., average time in queue, for that metric the user will see a percentage in the column entitled "value creating gap". This percentage value shows the degree to which the user's performance is superior to that of the peer group. The same applies to values placed in the column entitled "value destroying gap", e.g., average after call work time.

The financial gap analysis report allows analysis of the estimated economic cost gap between the requesting user and a peer group by identifying comparative performance and then calculating an absolute gap and a relative gap. The absolute gap represents the numeric difference between the score of the requesting user and that of the peer group, while the relative gap takes into account the percentage difference conveyed by such gap. A sample financial gap analysis report is shown in FIG. 13.

The financial gap analysis report also includes a conversion of the performance gap to a monetary value, the "gap value". This conversion allows the requesting user to prioritize those areas needing improvement on the basis of the "bottom line". Word formulas used to calculate the value of performance gaps are summarized in Tables I and II.

The gap versus solution optimizer report is a sophisticated report that takes each metric for which the user has a negative gap relative to the peer group and prints out a summary of potential solutions available on the market for narrowing or eliminating that gap. An approximate cost per agent seat and implementation time for each solution is also provided. Furthermore, the gap versus solution optimizer report assigns a risk factor to each solution, estimates the impact of the solution on the performance gap, and calculates an expected return on investment (ROI) from each solution. Finally, a weighted Optimal Decision Index is calculated which takes all of the factors into consideration and yields a listing ranked in descending order. A sample gap versus solution optimizer report is provided in FIG. 14.

TABLE I

INBOUND EFFICIENCY METRICS

| | |
|---|---|
| Talk time (min) | = (GAP in minutes) × (inbound calls handled)/(60 minutes per hour) × (hourly rate for a TSR in $) |
| After call work time (min) | = (GAP in minutes) × (inbound calls handled)/(60 minutes per hour) × (hourly rate for a TSR in $) |
| Calls abandoned (%) | = (GAP in %) × (inbound calls offered) × (perfect score in %) × (percent of perfect score resulting in loyalty in %) × (1 + positive word of mouth factor) × (customer lifetime value in $) × (1 − % abandoned that call back immediately) |
| Time in queue (sec) | = (GAP in seconds) × (inbound calls offered)/(60 minutes per hour) × (costs of toll-free call in cents per minute) |
| Calls blocked (%) | = (GAP in %) × (inbound calls offered) × (percent of perfect score resulting in loyalty in %) × (1 + positive word of mouth factor) × (customer lifetime value in $) × (1 − % abandoned that call back immediately) |
| TSR occupancy (%) | = (GAP in %) × (number of FTE hours per year) × (hourly rate for a TSR in $) |
| Time before abandoning (sec) | = (GAP in seconds)/(industry average time before abandoning) × (calls abandoned in %) × (inbound calls offered) × (perfect score in %) × (percent of perfect score resulting in loyalty) × (1 + positive word of mouth factor) × (customer lifetime value) × (1 − % abandoned that call back immediately) |
| Adherence to schedule (%) | = (GAP in %) × (TSR occupancy in %) × (number of FTE hours per year) × (hourly rate for a TSR in $) |
| Calls per 8 hr shift per TSR | = (GAP) × (5 days a week) × (52 weeks per year) × (talk time in minutes) + (after call work time in minutes)/(60 minutes per hour) × (hourly rate for a TSR in $) |
| Data entry error per thousand inputs | = (GAP)/(10 to convert to percent) × (inbound calls handled) × (percent of calls that require data entry in %) × (time it takes to correct one data entry error in minutes)/(60 minutes per hour) × (hourly rate for a TSR in $) |

TABLE II

HUMAN RESOURCE EFFICIENCY METRICS

| | |
|---|---|
| Turnover of part-time TSRs (%) | = (GAP in %) × (number of part-time TSRs) × (Cost to bring on a new TSR in $) |
| Turnover of full-time TSRs (%) | = (GAP) × (number of full-time TSRs) × (Cost to bring on a new TSR in $) |
| Initial training period (hours) | = (GAP in hours) × ((number of part-time TSRs) × (turnover in part-time TSRs in %) + (number of full-time TSRs) × (turnover in full-time TSRs in %)) × (hourly rate for a TSR in $) |
| Attendance (%) | = (GAP in %) × (number of FTE hours per year) × (hourly rate for a TSR in $) + (GAP in %) × (calls |

TABLE II-continued

| | |
|---|---|
| | abandoned) × (inbound calls offered) × (perfect score in %) × (percent of perfect score resulting in loyalty in %) × (1 + positive word of mouth factor) × (customer lifetime value in $) × (1 - percent abandoned that call back in %) |
| Costs to recruit a new TSR ($) | = (GAP in $) × ((number of part-time TSRs × (turnover of part-time TSRs in %) + (number of full-time TSRs) × (turnover in full-time TSRs in %)) |
| Hourly rate for a TSR ($) | = (GAP in $) × (number of FTE hours per year) |
| | INBOUND EFFECTIVENESS METRICS |
| Up and cross sell opportunities (%) | = (GAP in %) × (IF(up & cross sell opportunities that result in sale in % = 0 THEN take industry average ELSE take up & cross sell opportunities that result in sale in %) × (inbound calls handled) × (average sales value per call in $) |
| Up and cross sell resulting in a sale (%) | = (GAP in %) × (IF(up & cross sell opportunities in % = 0 THEN take industry average ELSE take up & cross sell opportunities in %) × (inbound calls handled) × (average sales value per call in $) |
| Perfect caller satisfaction score (%) | = (GAP in %) × (inbound calls handled) × (percent of perfect score resulting in loyalty in %) × (1 + positive word of mouth factor) × (customer lifetime value in $) |
| Once and done, or first time final calls (%) | = (GAP in %) × (inbound calls handled) × (talk time in minutes) + (after call work time in minutes)/(60 minutes in an hour) × (hourly rate of a TSR in $) + (GAP in %) × (inbound calls handled) × (percent of perfect score resulting in loyalty in %) × (1 + positive word of mouth factor) × (customer lifetime value in $) |

In a preferred embodiment, the Optimal Decision Index is determined using four measures of specific solutions, namely cost to implement, time to implement, risk to implement, and ROI to implement. A weighted average is taken of these four measures to determine which solution is optimal.

Through use of the present invention, decision makers are able to better understand the performance of their company as a whole. By benchmarking specific company processes or functions, on an articulated basis, businesses are able to improve their performance, which is critical in today's highly competitive market. The targeted benchmarking provided by the present invention enhances management decision-making abilities in selecting the "best" improvement initiatives.

The present invention further includes the capability to manipulate and mine data contained in the database in real time so as to generated tailored informational reports. For example, a requesting user could request a report reflecting average compensation for call center operators in the state of Arizona. By specifying particular data categories or indices, e.g., operator compensation, and desired qualifying limitations, e.g., geographic area, requesting users are able to obtain a wide range of customized reports specifically directed to their own informational needs. The data in the database can be manipulated according to any indexed data parameter or limitation.

The foregoing descriptions and drawings should be considered as illustrative only of the principles of the invention. The invention may be configured in a variety of formats and is not limited by the on-line presentation of the preferred embodiment. Numerous applications of the present invention will readily occur to those skilled in the art. Therefore, it is not desired to limit the invention to the specific examples disclosed or the exact configuration and operation shown and described. Rather, all suitable modifications and equivalents may be resorted to, falling within the scope of the invention.

What is claimed is:

1. A computerized method for conducting on-line benchmarking using a distributed computer network to connect a plurality of participants with computers to a host web site and host web site database, comprising the steps of:

receiving data from a user over the distributed computer network;

inputting, at the host site, the data to the database;

performing, using software at the host site, a data validity check on the database to identify suspect data;

confirming, on an automated basis, a validity status of the suspect data;

deleting data confirmed by the validity status check to be incorrect;

killing gaps in the database created by the step of data deletion, using software, to create a gap-killed database;

identifying a peer group;

generating, on an automated basis using the gap-killed database, a report comparing user data with data associated with said peer group.

2. The method as set forth in claim 1, the step of receiving data including the step of presenting to a user accessing the host site via the distributed computer network with a data input questionnaire.

3. The method as set forth in claim 1, the step of receiving data including the step of receiving electronic mail from the user over the distributed computer network, said electronic mail containing user data and being generated automatically by a user system.

4. The method as set forth in claim 3, the step of inputting the data being done automatically and including the step of extracting the user data from said electronic mail using a customized module.

5. The method as set forth in claim 1, further comprising after the step of inputting, the steps of:

copying the database to a mirror database; and performing all subsequent steps using the mirror database.

6. The method as set forth in claim 1, the step of performing a data validity check comprising the step of comparing a data value to a predetermined data comparator range.

7. The method as set forth in claim 6, the step of confirming a validity status comprising the steps of:

generating, on an automated basis, electronic mail to each user from which data believed to be incorrect was originally received;

receiving from each user, on an automated basis, data validity status.

8. The method as set forth in claim 7, further comprising the steps of:

deleting data confirmed by a user to be invalid; and modifying the data comparator range for data confirmed by the user to be valid.

9. The method as set forth in claim 1, the step of killing gaps in the database comprising the steps of:

selecting at least one data index from the database;

scanning the database to identify records in which the identified data index has been answered;

deleting records in which the identified data index is blank to leave a remaining set of records;

analyzing, for a current record having a gap and an associated gap index, a value of the identified data index;

comparing the value of the identified data index in the current record to corresponding values of the identified data index in the remaining set of records;

selecting from the remaining set of records those records whose corresponding values of the identified data index are within a preset number of standard deviations from the value of the identified data index in the current record; and filling the gap using the selected records.

10. The method as set forth in claim 9, the step of filling comprising the steps of:

inserting an average value of the gap index values from the selected records when the gap index value is a real number;

determining a most likely response value in view of the gap index values from the selected records, and inserting the most likely response value, when the gap index value is a nominal value.

11. The method as set forth in claim 1, the step of identifying a peer group including the steps of:

comparing, by the host site, identification data received from the user with corresponding identification data received from other participants; and selecting from the other participants a group of participants having identification data comparable with the identification data received from the user, the group of participants selected forming the peer group.

12. The method as set forth in claim 1, the step of identifying a peer group including the steps of:

receiving, by the host site, peer group identification parameters specified by the user;

matching, by the host site, the peer group identification parameters with records in the database meeting the parameters, the records meeting the specified parameters forming the peer group.

13. The method as set forth in claim 1, further comprising the steps of:

receiving, by the host site, data parameters specified by a user, said data parameters including at least one database index and at least one qualifying limitation; and generating a report containing database values associated with said index and said limitation.

14. The method as set forth in claim 1, the step of generating comprising the steps of:

identifying a performance gap between said user data and data associated with said peer group;

identifying a plurality of solutions to close said performance gap;

measuring, for each of said plurality of solutions, a cost to implement, a time to implement, a risk to implement, and a return on investment to implement;

taking a weighted average of said cost, time, risk and ROI to determine an optimal solution from among said plurality of solutions.

15. The method as set forth in claim 1, the step of generating comprising the steps of:

identifying a plurality of performance gaps between said user data and data associated with said peer group;

converting each of said plurality of performance gaps into a respective monetary value; and comparing the respective monetary values to determine a performance gap resulting in a largest financial loss.

16. A system for conducting on-line benchmarking comprising:

means for receiving data over a distributed computer network and for inputting said data to a database;

means for performing a data validity check on the database to identify suspect data;

means for confirming, on an automated basis, a validity status of the suspect data and for deleting data confirmed to be incorrect;

means for killing gaps in the database created by data deletion to create a gap-killed database;

means for defining a peer group;

means for generating, on an automated basis using the gap-killed database, a report comparing user data with data associated with said peer group.

17. The system as set forth in claim 16, said database including a mirror database representing a copy of said database and being regenerated on a regular basis, said data validity check being performed on said mirror database.

18. The system as set forth in claim 17, said means for confirming including a delinquent data checker for checking data validity of said mirror database, said delinquent data checker automatically initiating electronic mail to the user in response to suspect data.

19. The system as set forth in claim 17, said means for killing gaps including a gap killer for selecting database records within a preset number of standard deviations from an identified data index having a gap, and for filling the gap using values from the selected records.

* * * * *